(12) United States Patent
Ogasawara

(10) Patent No.: US 6,357,742 B1
(45) Date of Patent: Mar. 19, 2002

(54) PAPER CONVEYING MECHANISM INCLUDING A DEVICE FOR ALTERING THE DIRECTION OF THE PAPER

(75) Inventor: Mamoru Ogasawara, Ohmiya (JP)

(73) Assignee: Fuji Photo Optical Co., Ltd., Ohmiya (JP)

( * ) Notice: Subject to any disclaimer, the term of this patent is extended or adjusted under 35 U.S.C. 154(b) by 0 days.

(21) Appl. No.: 09/534,290

(22) Filed: Mar. 23, 2000

(30) Foreign Application Priority Data

Mar. 25, 1999 (JP) ............................................ 11-081815

(51) Int. Cl.⁷ .............................. B65H 5/00; B65H 7/02
(52) U.S. Cl. ........................................ 271/225; 271/228
(58) Field of Search ................................ 271/225, 226, 271/227, 228

(56) References Cited

U.S. PATENT DOCUMENTS 5,004,220 A * 4/1991 Dreschel et al. ......... 271/184 X
5,034,781 A * 7/1991 Watanabe ................ 355/317 X
5,697,609 A * 12/1997 Williams et al. ............. 271/228

FOREIGN PATENT DOCUMENTS

JP          59-17441 A    *  1/1984   ........... B65H/09/16

* cited by examiner

Primary Examiner—Christopher P. Ellis
Assistant Examiner—Kenneth W Bower
(74) Attorney, Agent, or Firm—Clifford Chance Rogers & Wells LLP

(57) ABSTRACT

A paper conveying mechanism comprises at least one pair of right and left conveying rollers, which are rotated at an identical speed and convey paper, and a driving device. The driving device simultaneously inclines the at least one pair of the right and left conveying rollers toward an identical direction along the surface of the paper, such that the axes of the at least one pair of the right and left conveying rollers are kept parallel with each other. The direction, along which the paper is conveyed with the conveying rollers, is altered easily with the simple constitution.

5 Claims, 5 Drawing Sheets

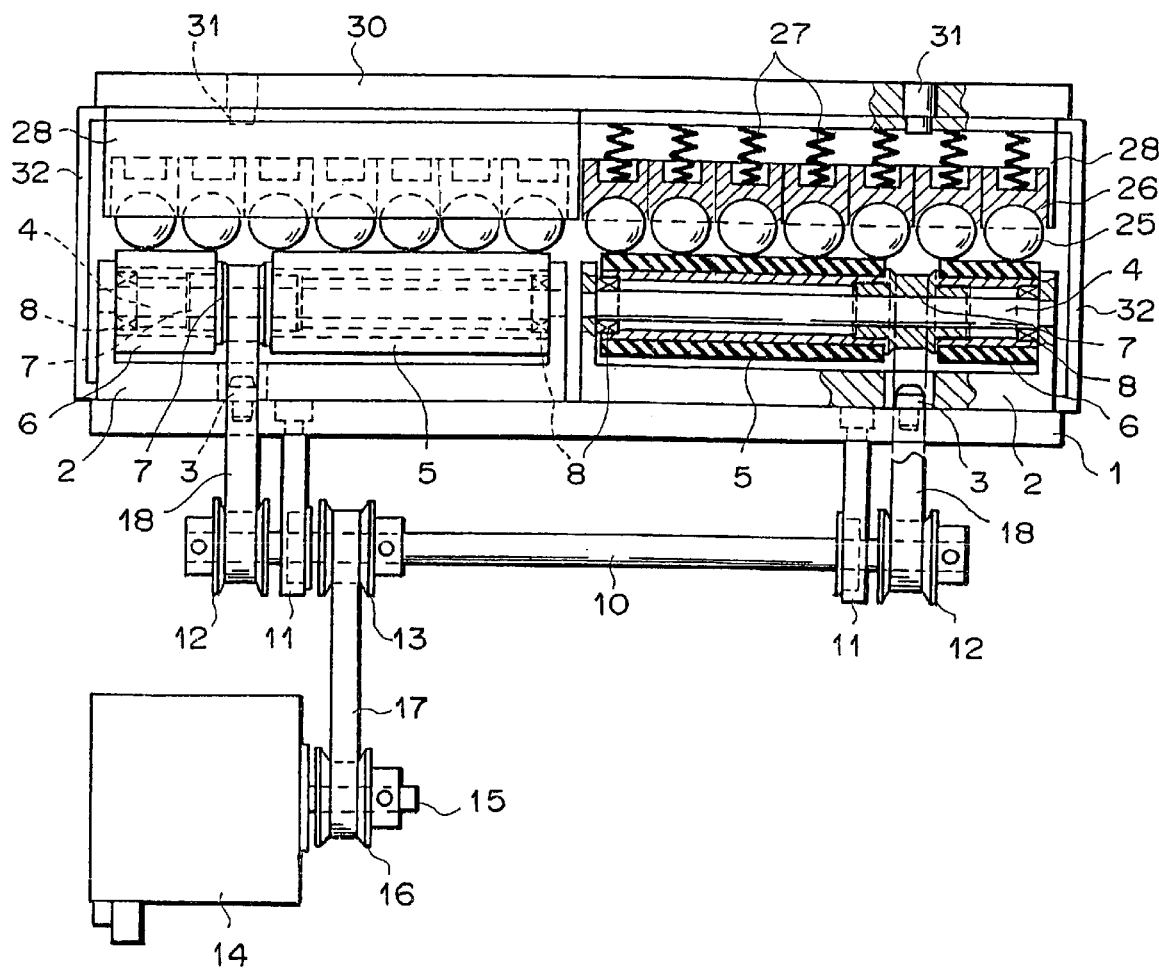
F I G . 1

PAPER CONVEYING MECHANISM INCLUDING A DEVICE FOR ALTERING THE DIRECTION OF THE PAPER

BACKGROUND OF THE INVENTION

1. Field of the Invention

This invention relates to a paper conveying mechanism. This invention particularly relates to a paper conveying mechanism, wherein the direction along which paper is conveyed is capable of being altered.

2. Description of the Prior Art

In photographic processing machines, and the like, as in cases where sheets of paper having been conveyed in a single row are to be distributed into a plurality of conveyance rows, it is often necessary for the direction, along which sheets of paper are conveyed, to be altered. For example, for such purposes, a conveying roller is inclined toward a desired direction of conveyance along the surface of paper. In such cases, the conveying roller has heretofore been inclined together with a driving motor for the conveying roller or has heretofore been inclined by the utilization of a bevel gear.

However, the conventional paper conveying mechanisms described above have the drawbacks in that the structure cannot be kept simple, and the weight of the mechanism cannot be kept light.

SUMMARY OF THE INVENTION

The primary object of the present invention is to provide a paper conveying mechanism, wherein the direction, along which paper is conveyed with conveying rollers, is capable of being altered easily with a simple constitution.

The present invention provides a paper conveying mechanism, comprising:

i) at least one pair of right and left conveying rollers, which are rotated at an identical speed and convey paper, and ii) driving means for simultaneously inclining the at least one pair of the right and left conveying rollers toward an identical direction along a surface of the paper, such that axes of the at least one pair of the right and left conveying rollers are kept parallel with each other.

The paper conveying mechanism in accordance with the present invention may be modified such that each of roller support beds is pivotably supported by one of a pair of right and left pivot shafts, which have axes normal to the surface of the paper and which are located at a predetermined spacing from each other on a base, each of roller support shafts is supported by one of the roller support beds such that each of the roller support shafts is parallel with the surface of the paper, and a pulley, which is located at a position approximately coinciding with the axis of the corresponding one of the pivot shafts and which is rotated by a driving source via a belt, and the corresponding one of the conveying rollers, which rotates together with the pulley, are located on each of the roller support shafts.

Also, the paper conveying mechanism in accordance with the present invention should preferably further comprise a plurality of balls, which are located in a row and on a line approximately parallel with each of the axes of the at least one pair of the right and left conveying rollers, and which push the paper against the conveying rollers.

With the paper conveying mechanism in accordance with the present invention, the driving means is provided for simultaneously inclining the pair of the right and left conveying rollers toward the identical direction along the surface of the paper, such that the axes of the right and left conveying rollers are kept parallel with each other. Therefore, the direction, along which the paper is conveyed with conveying rollers, can be altered easily with a simple constitution.

Also, with the paper conveying mechanism in accordance with the present invention, the pulley on the roller support shaft, which pulley receives the rotation driving force from the driving source via the belt, is located at the position approximately coinciding with the axis of the corresponding pivot shaft. Therefore, when the roller support bed is rotated around the pivot shaft, the belt becomes twisted and can thereby be kept in the state in which the belt is appropriately engaged with the pulley. Accordingly, the rotation driving force of the driving source can be appropriately transferred to the conveying roller.

Further, with the paper conveying mechanism in accordance with the present invention, as the means for pushing the paper against the conveying rollers, the plurality of the balls, which are located in a row and on a line approximately parallel with each of the axes of the pair of the right and left conveying rollers,are employed. Therefore,when the direction, along which the paper travels, is altered, the rotation of the balls can follow up the alteration of the direction, along which the paper travels. Accordingly, the advantages can be obtained in that the functions for shifting the paper to an oblique direction and thereby altering the direction, along which the paper is conveyed, can be obtained easily.

BRIEF DESCRIPTION OF THE DRAWINGS

FIG. 1 is a front view, partly in section, showing an embodiment of the paper conveying mechanism in accordance with the present invention.

DESCRIPTION OF THE PREFERRED EMBODIMENTS

The present invention will hereinbelow be described in further detail with reference to the accompanying drawings.

Figure 2:
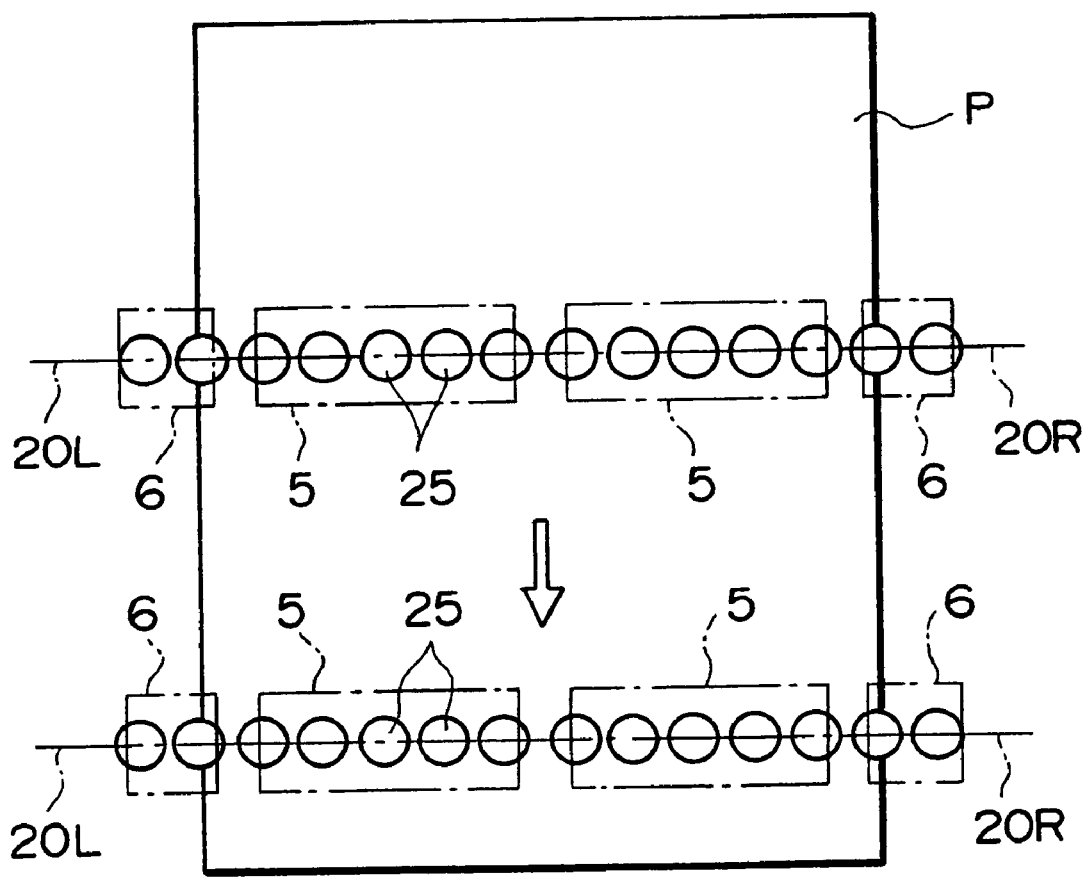
FIG. 2 is a schematic plan view showing how paper is conveyed straightly in the embodiment of FIG. 1, FIGS. 3A, 3B, and 3C are schematic plan views showing a mechanism for inclining conveying rollers along a surface of paper in the embodiment of FIG. 1.

FIG. 1 is a front view, partly in section, showing an embodiment of the paper conveying mechanism in accordance with the present invention. FIG. 2 is a schematic plan view showing how paper is conveyed straightly in the embodiment of FIG. 1.

With reference to FIG. 1, an elongated base 1 extends horizontally and in a direction, which is normal to the direction of conveyance of paper P indicated by the arrow in FIG. 2. A pair of right and left elongated roller support beds 2, 2 are located on the base 1. A pair of right and left pivot shafts 3, 3 are embedded into an upper surface of the base 1 and are located at a predetermined spacing from each other with respect to the longitudinal direction of the base 1. Each of the pivot shafts 3, 3 has an axis extending in the perpendicular direction in FIG. 1, i.e. in the direction normal to the surface of the paper P. Each of the roller support beds 2, 2 is pivotably supported by the corresponding one of the pivot shafts 3, 3, such that each of the roller support beds 2, 2 can be rotated around the corresponding pivot shaft 3 and in the horizontal plane, i.e. along the surface of the paper P. Two ends of a roller support shaft 4 are secured to side walls of each of the roller support beds 2, 2. The roller support shaft 4 is thus positioned horizontally in a bridge-like form between the side walls of each of the roller support beds 2, 2. The roller support shafts 4, 4 secured to the corresponding roller support beds 2, 2 are located in series with each other.

A long conveying roller 5 and a short conveying roller 6, each of which is provided with a rubber layer at its outer circumference, are fitted onto each of the roller support shafts 4, 4, such that the conveying rollers 5 and 6 can rotate around the corresponding roller support shaft 4. Also, a toothed pulley 7 is fitted onto each of the roller support shafts 4, 4, such that the toothed pulley 7 can rotate around the corresponding roller support shaft 4. The ends of the conveying rollers 5 and 6, which ends stand facing each other, are secured to the common toothed pulley 7, which is fitted for rotation onto each of the roller support shafts 4, 4. The other ends of the conveying rollers 5 and 6 are supported for rotation on the corresponding roller support shaft 4 via bearings 8, 8. The two toothed pulleys 7, 7 are located such that the center point of each toothed pulley 7 coincides with the position of an extension of the axis of the corresponding pivot shaft 3.

An intermediate shaft 10, which extends in parallel with the roller support shafts 4, 4, is located below the base 1. The intermediate shaft 10 is supported for rotation by lower end portions of a pair of support members 11, 11, which extend downwardly from the base 1. Three toothed pulleys 12, 13, and 12 are secured to the intermediate shaft 10. Also, a toothed pulley 16 is secured to a rotation shaft 15 of a conveyor motor 14. A toothed belt 17 is threaded over the toothed pulley 13 and the toothed pulley 16. Further, a toothed belt 18 is threaded over the toothed pulley 12, which is located at the left end position of the intermediate shaft 10, and the toothed pulley 7, which is fitted for rotation onto the left roller support shaft 4. In the same manner, a toothed belt 18 is threaded over the toothed pulley 12, which is located at the right end position of the intermediate shaft 10, and the toothed pulley 7, which is fitted for rotation onto the right roller support shaft 4. At least the two toothed belts 18, 18 are constituted of rubber belts having adaptability to twisting.

With the constitution described above, the rotation of the rotation shaft 15 driven by the conveyor motor 14 is transferred to the intermediate shaft 10 via the toothed belt 17. Also, the rotation of the intermediate shaft 10 is transferred to the left set of the conveying rollers 5, 6 and the right set of the conveying rollers 5, 6 via the toothed belts 18, 18. In this manner, the left set of the conveying rollers 5, 6 and the right set of the conveying rollers 5, 6 are rotated at an identical speed.

Figure 3A:
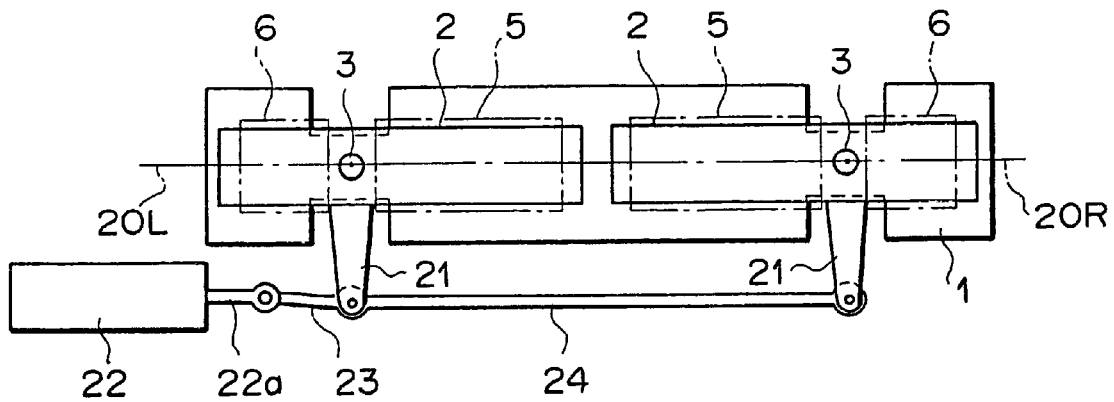
Figure 3B:
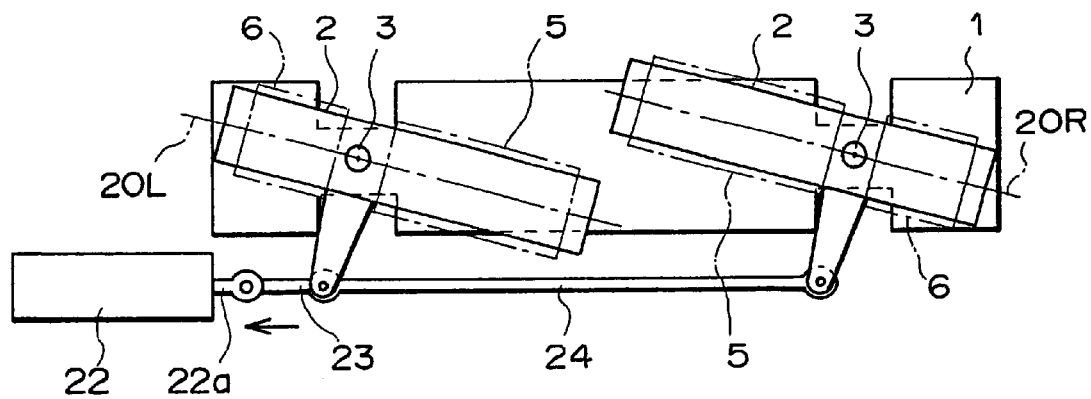
Figure 3C:
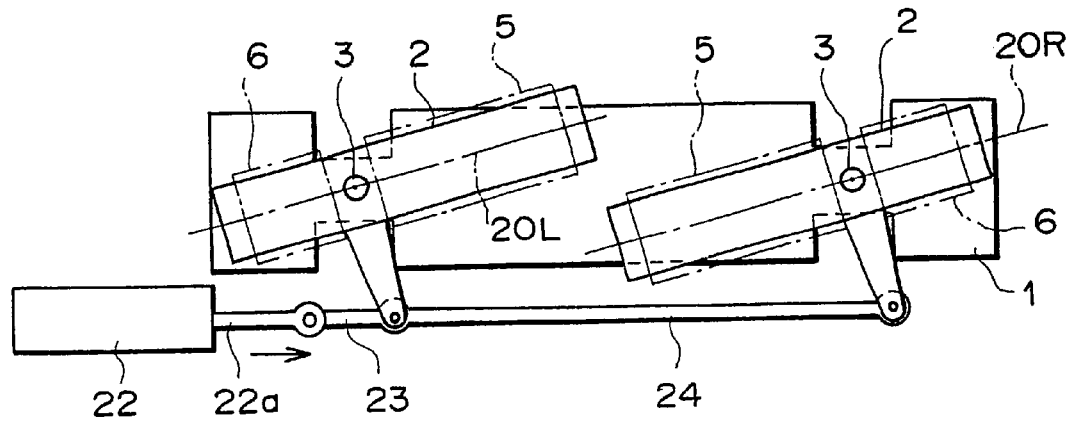

As illustrated in FIG. 3A, right and left arms 21, 21 having an identical length is projected respectively from the right and left roller support beds 2, 2. The left arm 21 extends horizontally from the center of rotation of the left roller support bed 2 to the direction, which is normal to the axis 20L of the left set of the conveying rollers 5 and 6. The right arm 21 extends horizontally from the center of rotation of the right roller support bed 2 to the direction, which is normal to the axis 20R of the right set of the conveying rollers 5 and 6. Also, as the means for rotating the roller support beds 2, 2, a driving cylinder 22 provided with a piston rod 22a is employed. By way of example, the piston rod 22a extends and contracts to three equally spaced stop positions. The end of the piston rod 22a is connected to the arms 21, 21 via links 23, 24. In FIG. 3A, the roller support beds 2, 2, which respectively support the left set of the conveying rollers 5, 6 and the right set of the conveying rollers 5, 6, are set at the initial positions, at which the roller axes 20L and 20R are aligned in a straight line with each other and on a line normal to the direction of conveyance of the paper P. As illustrated in FIG. 3B or 3C, when the driving cylinder 22 is activated, the roller support beds 2, 2 are simultaneously inclined to an identical direction along the surface of the paper P.

Seven balls 25, 25, . . . are aligned in one row and on the line parallel with the axis 20L of the left set of the conveying rollers 5 and 6. Also, seven balls 25, 25, . . . are aligned in one row and on the line parallel with the axis 20R of the right set of the conveying rollers 5 and 6. The paper P is pushed by the seven balls 25, 25, . . . against the left set of the conveying rollers 5, 6 and is pushed by the seven balls 25, 25, . . . against the right set of the conveying rollers 5, 6.

Each of the balls 25, 25, . . . is supported for rotation by a ball holder 26. The left set of the seven ball holders 26, 26, . . . are accommodated in a left holder case housing 28 such that they may be urged downwardly by corresponding springs 27, 27, . . . . Also, the right set of the seven ball holders 26, 26, . . . are accommodated in a right holder case housing 28 such that they may be urged downwardly by the corresponding springs 27, 27, . . . . A left pivot shaft 31 is embedded into a lower surface of a holder base 30, such that the axis of the left pivot shaft 31 coincides with the axis of the pivot shaft 3 of the left roller support bed 2. Also, a right pivot shaft 31 is embedded into the lower surface of the holder base 30, such that the axis of the right pivot shaft 31 coincides with the axis of the pivot shaft 3 of the right roller support bed 2. The left holder case housing 28 is pivotably supported by the left pivot shaft 31, and the right holder case housing 28 is pivotably supported by the right pivot shaft 31. As illustrated in FIG. 1, the left side wall of the left holder case housing 28 is connected by a connection member 32 to the left side wall of the left roller support bed 2. Also, the right side wall of the right holder case housing 28 is connected by a connection member 32 to the right side wall of the right roller support bed 2. Therefore, when the roller support beds 2, 2 are rotated by the driving cylinder 22 in the manner described above, the left holder case housing 28 rotates together with the left roller support bed 2, and the right holder case housing 28 rotates together with the right roller support bed 2. Accordingly, the balls 25, 25, . . . supported by the left holder case housing 28 are always aligned with one another along the axis 20L of the left set of the conveying rollers 5 and 6. Also, the balls 25, 25, . . . supported by the right holder case housing 28 are always aligned with one another along the axis 20R of the right set of the conveying rollers 5 and 6.

In this embodiment, as illustrated in FIG. 2, two mechanisms, each of which is constituted of the combination of the left set of the conveying rollers 5 and 6, the right set of the conveying rollers 5 and 6, and the corresponding rows of the balls 25, 25, . . . , are located in parallel with each other and at a predetermined spacing from each other with respect to the direction of conveyance of the paper P. The driving cylinders 22, 22 of the two mechanisms are operated simultaneously and in the same ways.

How this embodiment of the paper conveying mechanism in accordance with the present invention operates will be described hereinbelow.

Figure 4:
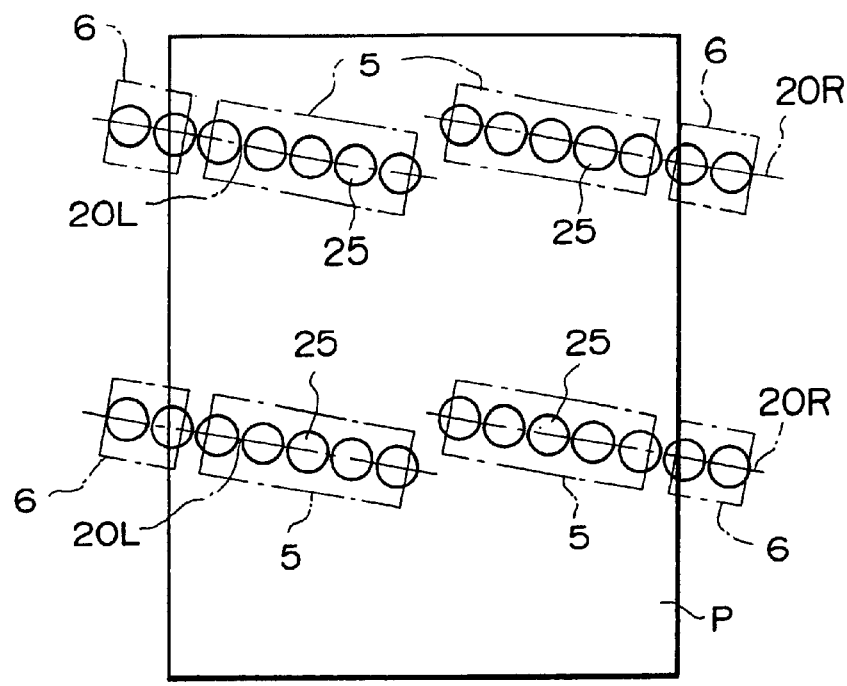
FIG. 4 is a schematic plan view showing how the direction, along which the paper is conveyed, is altered to a leftward oblique direction.
Figure 4:
Figure 4:
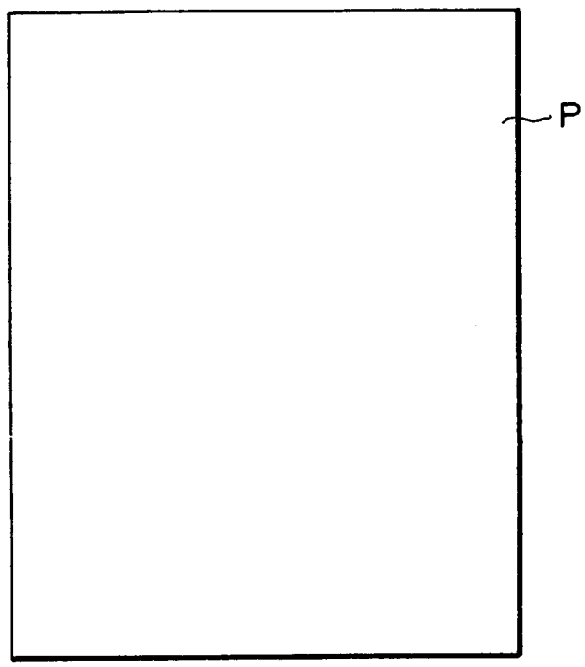

Firstly, as illustrated in FIG. 2 and FIG. 3A, in each of the two mechanism, the roller support beds 2, 2, which respectively support the left set of the conveying rollers 5, 6 and the right set of the conveying rollers 5, 6, are set at the initial positions, at which the roller axes 20L and 20R are aligned in a straight line with each other and on a line normal to the direction of conveyance of the paper P. In this state, the paper P is conveyed. When the leading end of the paper P has passed through the left set of the conveying rollers 5, 6 and the right set of the conveying rollers 5, 6 of the second mechanism (i.e., the mechanism located on the downstream side with respect to the direction of conveyance of the paper P in FIG. 2), the driving cylinders 22, 22 of the first mechanism (i.e., the mechanism located on the upstream side with respect to the direction of conveyance of the paper P in FIG. 2) and the second mechanism are activated. In this manner, as illustrated in FIG. 3B, the two roller support beds 2, 2 of the first mechanism and the two roller support beds 2, 2 of the second mechanism are rotated clockwise together with the corresponding holder case housings 28, 28, . . . . As a result, as illustrated in FIG. 4, the left set of the conveying rollers 5 and 6, the right set of the conveying rollers 5 and 6, and the corresponding rows of the balls 25, 25, . . . in the first mechanism are inclined along the surface of the paper P toward the direction (the leftward oblique direction in FIG. 4), to which the direction of conveyance of the paper P is to be altered. Also, in the same manner as that in the first mechanism, the left set of the conveying rollers 5 and 6, the right set of the conveying rollers 5 and 6, and the corresponding rows of the balls 25, 25, . . . in the second mechanism are inclined along the surface of the paper P toward the direction, to which the direction of conveyance of the paper P is to be altered. In this manner, the paper P is then conveyed toward the leftward oblique direction in FIG. 4.

Figure 5:
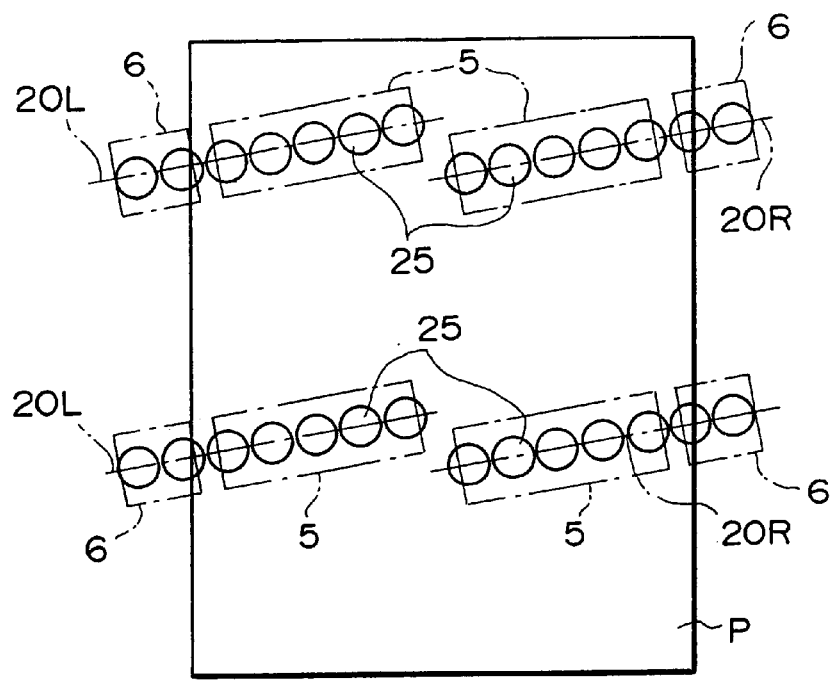
FIG. 5 is a schematic plan view showing how the direction, along which the paper is conveyed, is altered to a rightward oblique direction.
Figure 5:
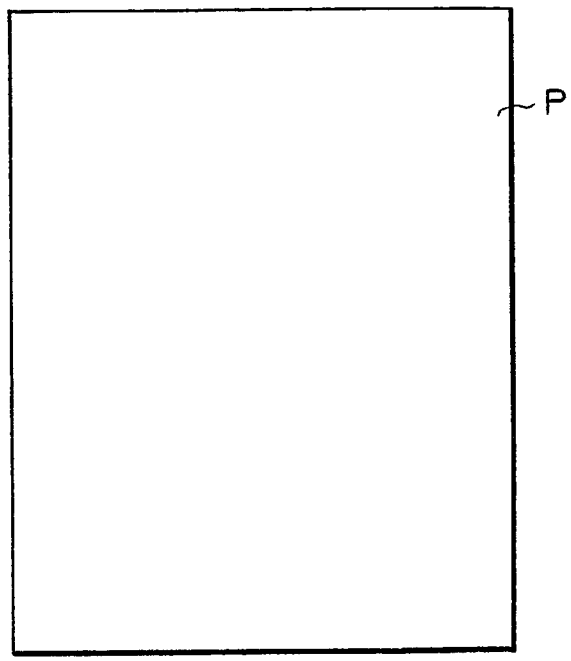

Thereafter, as illustrated in FIG. 2 and FIG. 3A, in each of the two mechanism, the roller support beds 2, 2, which respectively support the left set of the conveying rollers 5, 6 and the right set of the conveying rollers 5, 6, are set at the initial positions, at which the roller axes 20L and 20R are aligned in a straight line with each other and on a line normal to the direction of conveyance of the paper P. In this state, the next sheet of paper P is conveyed. When the leading end of the paper P has passed through the left set of the conveying rollers 5, 6 and the right set of the conveying rollers 5, 6 of the second mechanism, the driving cylinders 22, 22 of the first mechanism and the second mechanism are activated. In this manner, as illustrated in FIG. 3C, the two roller support beds 2, 2 of the first mechanism and the two roller support beds 2, 2 of the second mechanism are rotated counter-clockwise together with the corresponding holder case housings 28, 28, . . . . As a result, as illustrated in FIG. 5, the left set of the conveying rollers 5 and 6, the right set of the conveying rollers 5 and 6, and the corresponding rows of the balls 25, 25, . . . in the first mechanism are inclined along the surface of the paper P toward the direction (the rightward oblique direction in FIG. 5), to which the direction of conveyance of the paper P is to be altered. Also, in the same manner as that in the first mechanism, the left set of the conveying rollers 5 and 6, the right set of the conveying rollers 5 and 6, and the corresponding rows of the balls 2 5, 25, . . . in the second mechanism are inclined along the surface of the paper P toward the direction (the rightward oblique direction in FIG. 5), to which the direction of conveyance of the paper P is to be altered. In this manner, the paper P is then conveyed toward the rightward oblique direction in FIG. 5.

As described above, with this embodiment, each of the two mechanisms is constituted of the combination of the left set of the conveying rollers 5 and 6, the right set of the conveying rollers 5 and 6, and the corresponding rows of the balls 25, 25, . . . , which push the paper P against the conveying rollers with the urging force of the springs 27, 27, . . . . The two mechanisms are also provided with the driving means for simultaneously inclining the two combinations of the left set of the conveying rollers 5 and 6, the right set of the conveying rollers 5 and 6, and the corresponding rows of the balls 25, 25, . . . toward an identical direction along the surface of the paper P, such that the conveying roller axes 20L, 20R, 20L, 20R are kept parallel with one another. Therefore, sheets of paper P can be distributed to desired directions of conveyance with the markedly simple constitution.

Also, with this embodiment, the center point of the toothed pulley 7 fitted for rotation onto each roller support shaft 4 coincides with the position of the axis of the corresponding pivot shaft 3. Further, each toothed belt 18 for driving the conveying rollers 5 and 6 is formed from a rubber belt having adaptability to twisting. Therefore, in cases where the roller support beds 2, 2 are rotated around the corresponding pivot shafts 3, 3, such that the axis 20L of the left set of the conveying rollers 5, 6 and the axis 2OR of the right set of the conveying rollers 5, 6 are inclined along the surface of the paper P and with respect to the direction, which is normal to the direction of conveyance of the paper P, the rotation driving force can be appropriately transferred to each set of the conveying rollers 5 and 6.

Further, with this embodiment, as the means for pushing the paper P against the left set of the conveying rollers 5, 6 and the right set of the conveying rollers 5, 6, the plurality of the balls 25, 25, . . . , which are located in a row and on the line approximately parallel with each of the axis 20L of the left set of the conveying rollers 5, 6 and the axis 20R of the right set of the conveying rollers 5, 6, are employed. Therefore, the advantages can be obtained in that the functions for shifting the paper to an oblique direction and thereby altering the direction, along which the paper is conveyed, can be obtained easily.

As an alternative to the constitution described above, a plurality of balls 25, 25, . . . may be located previously at fixed positions corresponding to the three positions of rotation shown in FIG. 2, FIG. 4, and FIG. 5, to which each set of the conveying rollers 5 and 6 are rotated. In such cases, the mechanism for altering the positions of the balls 25, 25, . . . can be omitted.

The paper conveying mechanism in accordance with the present invention is suitable particularly for the conveyance of paper in photographic processing machines. However, the paper

What is claimed is:

1. A paper conveying mechanism comprising:

at least one pair of right and left conveying rollers for conveying paper along a path;

means for pushing the paper against the surface of said at least one pair of right and left conveying rollers; and altering means for simultaneously altering the direction of the paper along the path by inclining the at least one pair of the right and left conveying rollers toward an identical direction along a surface of the paper such that the axes of the at least one pair of the right and left conveying rollers are kept parallel with each other.

2. The paper conveying mechanism as defined in claim 1, wherein said means for pushing comprises a plurality of balls located in a row and on a line approximately parallel with each of the axes of the at least one pair of right and left conveying rollers.

3. The paper conveying mechanism as defined in claim 2, further comprising roller shafts for supporting the at least one pair of left and right conveying rollers, an auxiliary base for supporting the roller shafts, a main base for supporting the auxiliary base, the main base including left and right pivot shafts for pivotably supporting the auxiliary base, and a pulley system drivingly connected to the roller shafts for driving the at least one pair of left and right conveying rollers.

4. The paper conveying mechanism as defined in claim 3, wherein the left and right pivot shafts are located at a predetermined distance from each on the main base and have axes normal to the surface of the paper.

5. The paper conveying mechanism as defined in claim 4, wherein the pulley system comprises a pair of pulleys located such that their respective center point coincides with the axes of the left and right pivot shafts.

\* \* \* \* \*